Mar. 6, 1923.
G. C. JETT.
TRACTOR TRUCK MECHANISM.
FILED OCT. 11, 1919.
1,447,210.
3 SHEETS—SHEET 1
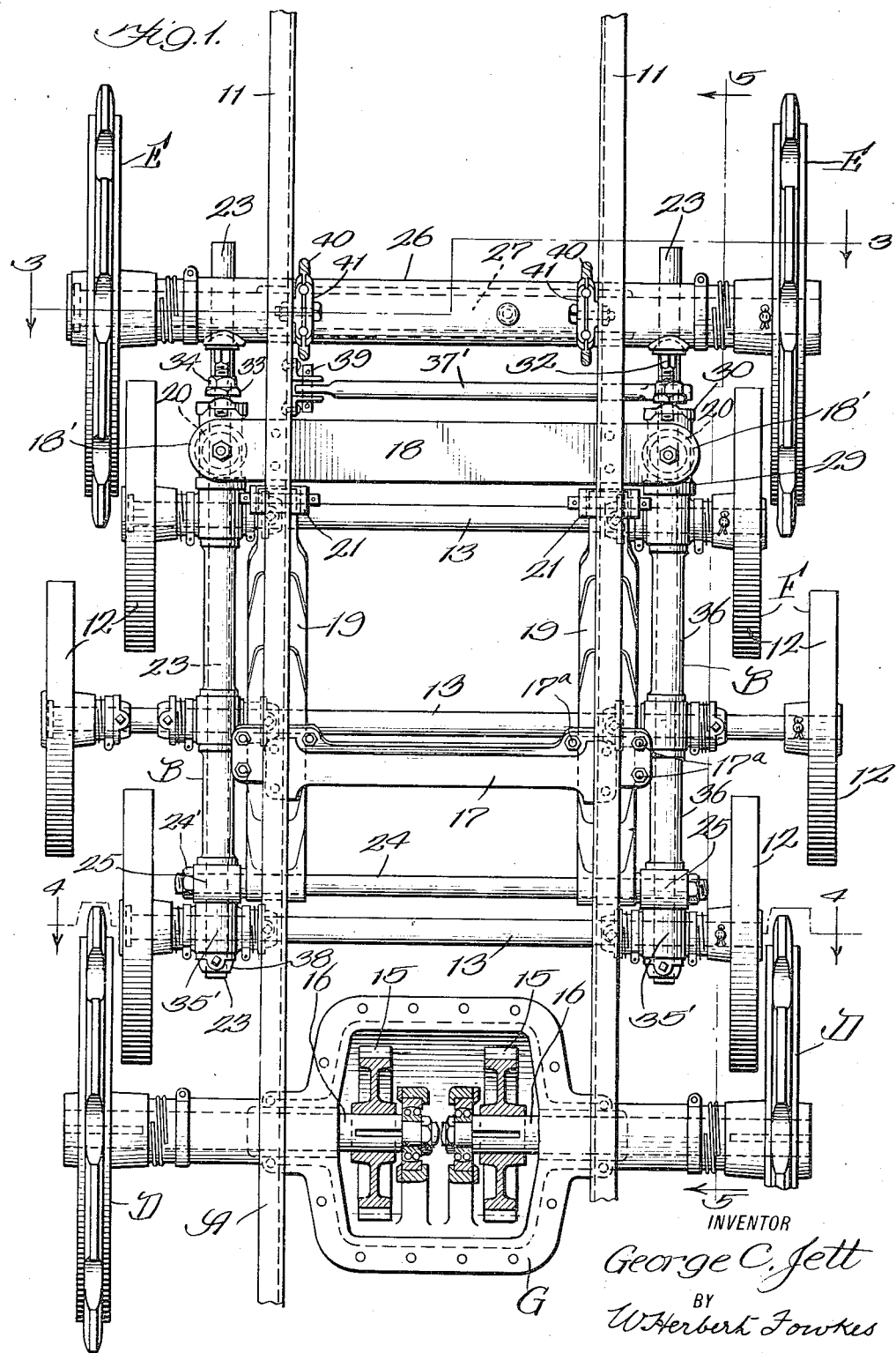
INVENTOR
George C. Jett
BY
W. Herbert Fowkes
ATTORNEY

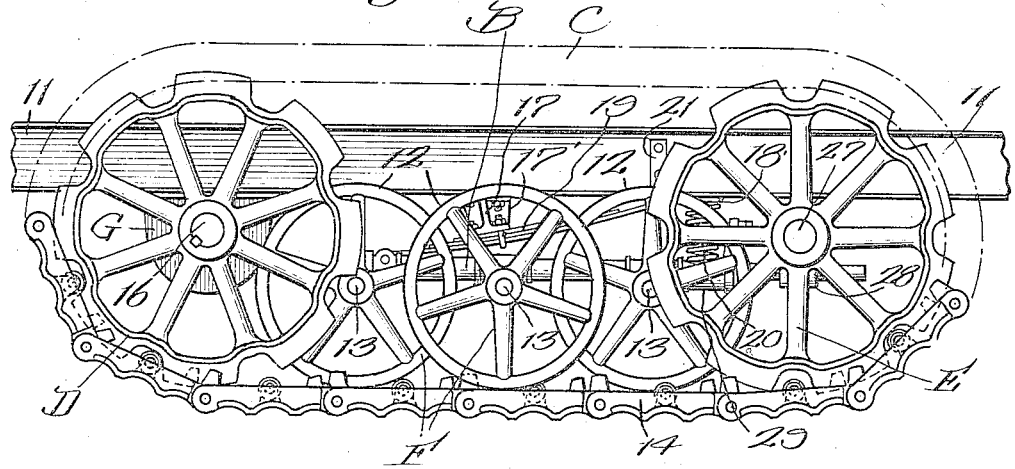
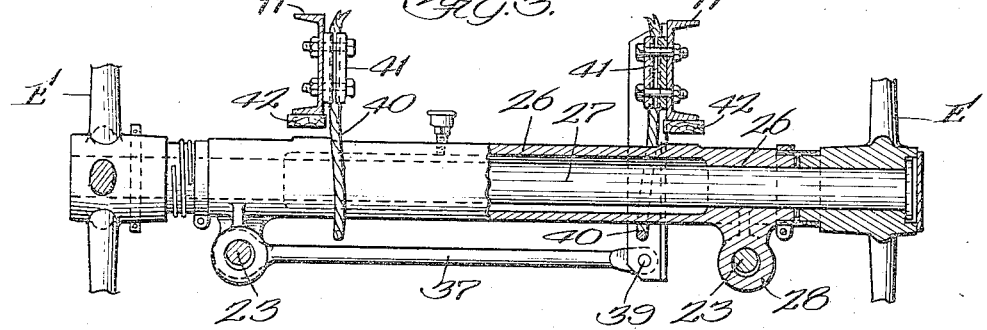
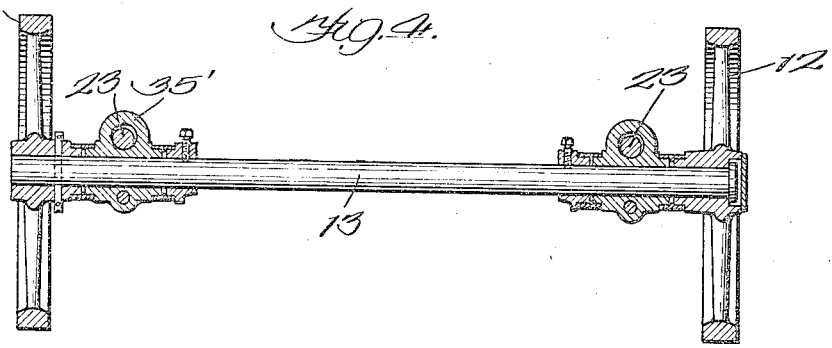

Mar. 6, 1923.
G. C. JETT.
TRACTOR TRUCK MECHANISM.
FILED OCT. 11, 1919.
1,447,210.
3 SHEETS—SHEET 3.
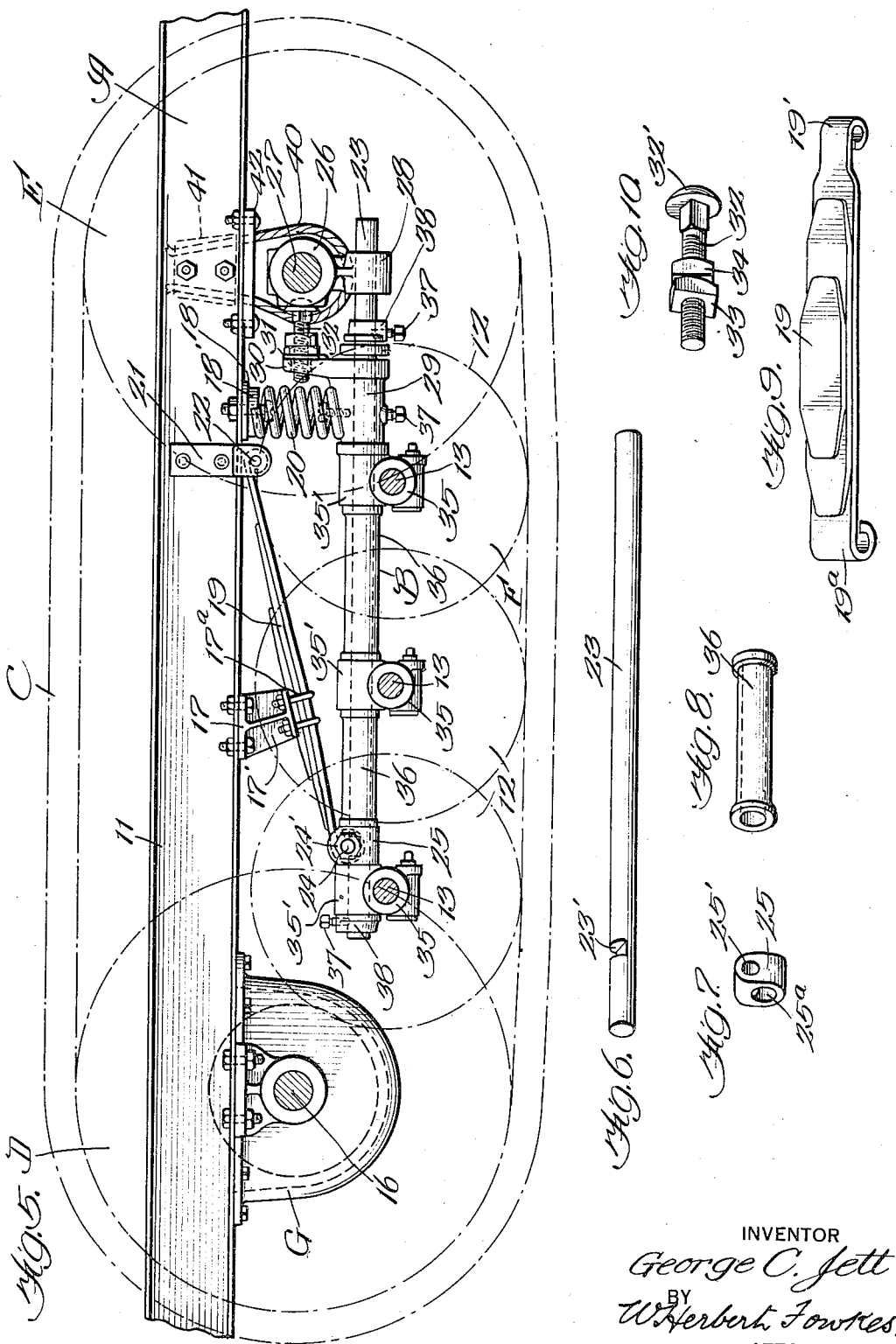
INVENTOR
George C. Jett
BY
W. Herbert Fowkes
ATTORNEY Patented Mar. 6, 1923.

1,447,210

UNITED STATES PATENT OFFICE.

GEORGE C. JETT, OF MILWAUKEE, WISCONSIN, ASSIGNOR OF TWO-FIFTHS TO WALTER H. STIEMKE, OF MILWAUKEE, WISCONSIN.

TRACTOR TRUCK MECHANISM.

Application filed October 11, 1919. Serial No. 330,106.

*To all whom it may concern:*

Be it known that I, GEORGE C. JETT, a citizen of the United States, and residing at Milwaukee, in the county of Milwaukee and State of Wisconsin, have invented new and useful Improvements in Tractor Truck Mechanism, of which the following is a specification.

My present invention relates to truck mechanism designed for use in connection with tractors or other traction engines employing endless traction belts and weight bearing wheel sets, and has for one of its salient objects to provide a unitary self-contained traction truck frame for the main frame and common to both the bearing wheel sets and the endless traction belts on whose lower stretches the wheel sets travel. In other words, instead of employing a truck frame for each endless belt and each bearing wheel set, the prevailing construction, I aim to provide a single truck frame whereby to materially reduce the dead weight and the manufacturing cost of the tractor, a construction, as I have found in practice, particularly desirable in small-sized tractors. The invention also objectively contemplates the provision of a horizontally disposed rectangular truck frame wherein the construction is very much simplified, the parts thereof being easily fabricated and readily assembled. This construction also provides for relative flexibility of the actual frame elements in the vertical direction at their joints within certain well defined limits, during the travel of the tractor, while maintaining rigidity in a horizontal plane. In the present instance this frame comprises longitudinal and connecting transverse frame elements, one of the latter constituting a sleeve or bearing for the idler sprocket shaft which extends transversely across the front of the truck frame between said idler sprockets. Another object of the invention is the provision of a construction of this sort, and wherein the sleeve is loosely carried on the forward ends of the longitudinal elements, first, to provide for flexibility in the front end of the frame, and, second, to permit of the ready employment of take-up means for the purpose of tightening and properly positioning the belts without in any way detracting from the desired flexibility of the frame.

A further object of the invention is the provision of means for yieldingly and pivotally connecting the main frame and the traction truck frame. With this aim in view, I interpose between the frames in the present instance a radius rod and two-part spring means, one part of which latter is inclined forwardly toward the other part and the main frame and has a pivotal connection with the rear transverse frame element. In this manner flexibility at the joints of the sub-frame is permitted within the limits prescribed by said means, and at the same time the main frame is entirely spring mounted on the sub-frame and held in correct relation thereto.

A still further object of the invention is to provide means whereby the positioning of bearing wheels in the truck frame may be facilitated to a marked degree. In the present exemplification, the longitudinal truck frame elements are composed of rods on each of which removable bearing wheel journal boxes and spacing tubular sections are alternately arranged to position the boxes, and all are constructed for sliding movement along the rods in the assembling operation to assume their proper relation and attain the ultimate operative positioning of the bearing wheels. An improved construction with increased efficiency and utility are still further objects of my invention.

These, together with such other objects as may hereinafter appear, or are incident to my invention, I attain by means of a construction illustrated in preferred form in the accompanying drawings, wherein, Figure 1 is a top plan view of the chassis or body portion only of a tractor to which one embodiment of my invention is shown applied;

Figure 2 depicts a view in side elevation, on a reduced scale, of the tractor body of Figure 1 and an endless traction belt with which it co-operates;

Figures 3 and 4 are cross-sectional views taken along the lines 3—3 and 4—4 of Figure 1, respectively;

Figure 5 represents a longitudinal sectional view of the tractor body taken along the line 5—5 of Figure 1; and Figures 6, 7, 8, 9, and 10 are perspective views detailing parts of my invention.

In the drawings:

The reference character 11 denotes the longitudinal members of the main tractor frame A, B designates the traction truck or sub-frame, and C the endless tread belts disposed at each side of the frames and carried in a driving and supported relation by the draft sprockets D and front idler sprocket wheels E. On the lower stretch of each endless belt is a set of weight bearing wheels designed to roll thereon in the travel of the tractor, the sets being indicated in general by the character F and the wheel members thereof in particular by the reference numeral 12, opposite members of the sets being connected by the axles 13, which, in the present instance, are varied in length in order to stagger the wheels of each set, as shown. The end wheels, moreover, may also be staggered with respect to the sprockets D and E. Such an arrangement is of advantage since the belt length obviously is decreased and the possibility of any buckling of the belt treads 14 is positively eliminated.

G is a casing carried by the main frame 11, and in which any suitable final drive members 15 may be positioned in a drive relation with the aligned shaft sections 16 of the draft sprockets D to ultimately drive the belts. Secured also to the members 11 are transverse bars 17 and 18, the former of which has depending end portions 17' provided with spring body clips 17ª whereby to centrally embrace and position the inclined leaved springs 19, and the bar 18 being formed with cantilever ends constituting positioning seats 18' for rigidly securing the upper ends of the compression coil springs 20. These main frame members are preferably channel-irons, and to each of their webs is fixedly secured a shackle member 21, in whose lower portion is mounted a bolt 22 about which the forward eye 19' of a leaf spring 19 has a bearing, the lower spring eye in each case being designated by the reference character 19ª. It is my aim to utilize these springs 19, 20, as a two-part means for yieldingly mounting the main frame A on the sub-frame B, which latter together with the weight bearing wheels 12 stand in a supporting relation with reference to the main frame. It is also a purpose of this invention to construct a part of said means so as to co-operate with the rear portion of the sub-frame and permit of the frame having pivotal movement on a floating axis against the other part of said means.

In the present instance, the sub-frame B comprises longitudinal rods 23, preferably of circular cross-section and notched at 23' as shown, and a rear transverse rod 24, of similar contour, which rod is terminally provided with swivels 25 having upper and lower intersecting bores 25' and 25ª. These swivels 25 are designed to be slidably advanced on the rear ends of the rods 23 until the bores in each case register with the notches 23', whereupon the rod 24 is inserted endwise through the bores 25' and notches 23' to engage both and thereby lock the rods 23 against longitudinal displacement. End nuts 24' are provided to secure the rod 24 in place, and it will be observed that the latter also serves as end bolt or pivotal axis for the rear and lower eyes 19ª of the leaf springs 19. This axis moreover is not fixed in all directions for the reason that the rear cantilever ends of these springs may have a certain amount of vertical deflection during travel of the tractor over uneven ground. The front transverse member of the sub-frame takes the form of a sleeve 26 providing bearings 26' for the axle 27 common to both idler sprocket wheels E, the sleeve being formed with bosses 28 bored large enough to slide longitudinally and rock on the forward ends of the rods 23.

Detachably secured by screws 37 on each rod adjacent to the idler sprocket sleeve 26, and rearwardly thereof, is a tubular sleeve or boss 29 constituting a bearing block for one of the springs 20 and to which its lower portion is suitably engaged, the bosses being formed with upwardly directed flanges 30 apertured at 31 to loosely receive the take-up bolts 32 whose rounded heads 32' engage in corresponding recesses, formed in the axle sleeve 26, to provide a ball and socket connection at these points and permit rocking movement of said sleeve on either rod 23. Suitable means for advancing the bolts 32 to take-up slack in the belts due to wear at their tread pivots and for holding them when advanced, are provided in the form of nuts 33 and 34, the former of which act against the front faces of the flanges 30 as will be readily understood.

Placed along the rods 23 at suitable intervals are journal boxes 35 for the through axles 13 of the weight bearing wheels 12, these boxes constructed with hanger bosses 35' bored to permit slight relative rocking movement between each of them and its respective rod during uneven belt movement, and being provided with tubular spacing members 36 distributed on the rods to correctly position the axles 13, and therefore the wheels 12.

Obviously the assembling of these spacing members, the swivels 25, the journal boxes, the spring seating blocks, and the transverse members 24 and 26 is simplified to a noteworthy degree, and once on they may be held and retained very readily in position on the rods by the means provided for that purpose. Those located between the swivel 25 and the seating block 29 are of course held related by the screw 37 at one end of each rod 23 and the rod 24 on the other, the latter as previously stated having a key-like engagement with each notch 23'. Those outside the members 25 and 29 such as the rear journal box and the radius bar 37' are held in place by any suitable means, as the collars 38, and it will be observed that the radius bar has its inner end pivoted at 39 to an extension of one of the main frame members 11, while its outer end fits loosely about the rod 23 at the other side of the tractor body, and in advance of the seating block on that rod.

Reference numeral 40 denotes a pair of intervaled wire loops disposed about the sleeve 26 and terminally secured to the webs of the main frame members by the clamp 41 so as to constitute a flexible connection between the sleeve and the main frame, permitting the oscillation of the truck frame B, independently on each side thereof, within the extreme limits defined by said loop and the bumper blocks 42, though it will be understood that such oscillation is in the main controlled by the coil springs 20.

From the foregoing, it will be seen that I provide a simple and substantial form of truck frame, upon which the main tractor frame is spring mounted, admitting of the necessary distortion or raising of any corner thereof so that the belts may yieldingly take up varying positions to conform with whatever rough and uneven ground they may individually encounter. The rear transverse rod 24 of the truck frame not only constitutes a hinge element capable of upward deflection, but acts also as a swivelled transverse connection. It and the sleeve 26 maintain the rectangular relation of the truck frame, without introducing transverse and torsional stresses, and ensure the desired amount of flexibility of the corner joints, so that one or more joints may rise slightly relatively of the others. It will also be apparent that a very effective form of take-up means for the belt is presented in this embodiment of my invention, and a one adapted to securely hold the idler sprockets in their proper relation without disturbing or detracting from the desired flexibility of the corner joints of the truck frame. Obviously the through axle connections between the weight bearing wheels eliminates unwieldy journal boxes, reduces bearings and bearing parts to the minimum, and permits of a truck frame construction possessing simplicity and economy to the maximum extent. Other advantages will be apparent to those skilled in the art.

I claim:

1. In a tractor, the combination of a main frame, a pair of endless belt traction members located at the sides thereof, a unitary self-contained traction frame positioned horizontally between said pair of traction members and including an axle extending from side to side thereof, and weight bearing wheels carried by said axle and outside of said traction frame and bearing on the lower stretches of both said traction members.

2. In a vehicle of the character described, the combination of a main frame having a pair of endless belt traction members located at the sides thereof, weight bearing wheels for both said traction members, a single traction frame transversely arranged as a self-contained unit between said traction members and between said wheels, an axle attached to said traction frame, upon the ends of which said weight-bearing wheels are mounted, and spring means connecting said frames, constituting the mounting for the main frame.

3. In a tractor, the combination of a main frame, a pair of endless belt traction members located at the sides thereof, a traction frame disposed between said traction members in a yielding supporting relation with the main frame, weight bearing wheels for said traction members positioned alongside both said frames, and an axle carried by said traction frame for connecting said weight bearing wheels.

4. In a tractor, the combination of a main frame, a pair of endless belt traction members located at the sides thereof, a traction frame disposed between said traction members in a yielding supporting relation with the main frame, and yieldably connected therewith, weight bearing wheels for said traction members positioned alongside both said frames, an axle carried by said traction frame for connecting said weight bearing wheels, and a transverse radius rod terminally associated with opposed side portions of the main frame and said traction frame and being located in advance of the pivotal connection between said frames.

5. In a tractor, the combination of a main frame having a pair of traction sprockets, a pair of endless belt traction members driven by said sprockets, idler sprockets for said traction members, a traction frame extending in a transverse direction between said traction members in a supporting relation with said main frame, and an axle for said idler sprockets journalled in said traction frame.

6. In a tractor, the combination of a main frame having a pair of traction sprockets, a pair of endless belt traction members driven by said sprockets, idler sprockets for said traction members, a traction frame extending in a transverse direction between said traction members in a supporting relation with said main frame, an axle for said idler sprockets journalled in said traction frame, a spring mounting for the main frame interposed between said frames, and a flexible connection between the main frame and said axle.

7. The combination with a main frame, of traction mechanism comprising a pair of traction sprockets mounted in said frame, a pair of endless belt traction members driven by said sprockets, a weight bearing wheel for each traction member, a traction frame co-operating with said wheels to support the main frame, and an axle for the weight bearing wheels having aligned bearings in said traction frame, the latter being common to both traction members and provided with idler sprockets for said members.

8. The combination with a main frame, of traction mechanism comprising a pair of traction sprockets mounted in said frame, a pair of endless belt traction members driven by said sprockets, a weight bearing wheel for each traction member, a traction frame co-operating with said wheels to support the main frame, an axle for the weight bearing wheels having aligned bearings in said traction frame, the latter being common to both traction members and provided with idler sprockets for said members and a pivot rod, and a leaf spring connection between said pivot rod and the main frame.

9. The combination with a main frame, of traction mechanism comprising a pair of traction sprockets mounted in said frame, a pair of endless belt traction members driven by said sprockets, a weight bearing wheel for each traction member, a traction frame co-operating with said wheels to support the main frame, an axle for the weight bearing wheels having aligned bearings in said traction frame, the latter being common to both traction members and provided with idler sprockets for said members and a pivot rod, and a leaf spring connection between said pivot rod and the main frame and inclining upwardly to engage the latter in advance of said rod.

10. The combination with a main frame, of traction mechanism comprising a pair of traction sprockets mounted in said frame, a pair of endless belt traction members driven by said sprockets, a weight bearing wheel for each traction member, a traction frame co-operating with said wheels to support the main frame, an axle for the weight bearing wheels having aligned bearings in said traction frame, the latter being common to both traction members and provided with idler sprockets for said members and a pivot rod, and a leaf spring connection between said pivot rod and the main frame and inclining upwardly to engage the latter in advance of said rod, and a cantilever plate carried by said main frame provided with a spring means engaging the traction frame in advance of said leaf spring.

11. In a tractor mechanism, the combination with a main frame and a pair of endless belts, of a bearing wheel traction frame including axle members extending transversely from side to side of said frame, bearing wheels for said belts located at the sides of the main frame on said axle members, and yielding connections between said frames.

12. In traction mechanism, the combination with a main frame and a pair of endless belts, of a bearing wheel traction frame, bearing wheels for said belts located at the sides of the main frame, an axle extending through the traction frame whereby to connect the wheels, and constituting a transverse member of said traction frame, and a transverse radius rod pivotally connecting said frame.

13. In traction mechanism, the combination of a pair of connected main frame members, a pair of longitudinal sub-frame members disposed below and in substantial parallelism with said main frame members, and pivotally connected thereto, and a set of weight bearing wheels disposed alongside each main frame member, said sub-frame members being transversely connected by axles carrying the sets of weight bearing wheels whereby to constitute a self-contained traction sub-frame.

14. In traction mechanism, the combination of a pair of connected main frame members, a pair of longitudinal sub-frame members disposed below and in substantial parallelism with said main frame members, and each being yieldingly and pivotally related thereto about a common axis, and a set of weight bearing wheels disposed alongside each main frame member, said sub-frame members being transversely connected to constitute a self-contained traction sub-frame, axles for connecting the sets of weight bearing wheels, said axles having different lengths whereby to stagger the wheels of each set, and endless traction belts for said wheel sets.

15. In traction mechanism, the combination of a main frame, comprising longitudinal frame members and transverse axles, a traction sub-frame comprising longitudinal frame members and transverse members connecting the longitudinal frame members near their front and rear ends, spring means interposed between the frames and including one or more leaved members inclining from one of said transverse members to the main frame, and weight bearing wheels carried by the transverse members of the sub-frame.

16. In traction mechanism, the combination of a main frame, a traction sub-frame comprising longitudinal frame members and transverse members connecting the longitudinal frame members near their front and rear ends, spring means interposed between the frames and including one or more leaved members inclining from one of said transverse members to the main frame, weight bearing wheels carried by the longitudinal frame members, and axles extending through the sub-frame in parallelism with said transverse connecting members.

17. In traction mechanism, the combination with a main frame, of a traction sub-frame disposed in a supporting relation to said main frame and comprising longitudinal rods transversely connected, a weight bearing wheel located alongside each of said rods, and journal members loosely mounted on said rods for slight relative movement axially thereof and in which said wheels are journaled.

18. In traction mechanism, the combination with a main frame, of a traction sub-frame disposed in a supporting relation to said main frame and comprising longitudinal rods transversely connected, a weight bearing wheel located alongside each of said rods, and journal members loosely mounted on said rods for slight relative movement axially thereof and in which said wheels are journalled, and relatively movable sprocket driven traction belts carried by said frames and adapted to have their lower stretches engaged by said wheels.

19. In traction mechanism, the combination with a main tractor frame and a pair of endless traction belts located at the sides of said frame, of a traction frame therefor embodying longitudinal rods each provided with a pair of journal members loosely mounted thereon, means for flexibly connecting said longitudinal rods in the transverse direction, a set of bearing wheels arranged to engage the lower stretch of each traction belt, and axles connecting the wheels of one set with the wheels of the other set and being journalled in said journal members.

20. In traction mechanism, the combination with a main tractor frame and a pair of endless traction belts located at the sides of said frame, of a traction frame therefor embodying longitudinal rods each provided with a pair of journal members loosely mounted thereon, means for flexibly connecting said longitudinal rods in the transverse direction, a set of bearing wheels arranged to engage the lower stretch of each traction belt, axles connecting the wheels of one set with the wheels of the other set and being journalled in said journal members, and detachable means on said rods for spacing the journal members of each pair.

21. In traction mechanism, the combination with a main tractor frame and a pair of endless traction belts located at the sides of said frame, of a traction frame therefor embodying longitudinal rods each provided with a pair of journal members loosely mounted thereon, means for flexibly connecting said longitudinal rods in the transverse direction, a set of bearing wheels arranged to engage the lower stretch of each traction belt, axles connecting the wheels of one set with the wheels of the other set and being journalled in said journal members, and a tubular member on each rod adapted for spacing the journal members of each pair and the wheels of each set.

22. In traction mechanism, the combination with a main tractor frame and a pair of endless traction belts located at the sides of said frame, of a traction frame therefor embodying longitudinal rods each provided with a pair of journal members loosely mounted thereon, means for flexibly connecting said longitudinal rods in the transverse direction, a set of bearing wheels arranged to engage the lower stretch of each traction belt, axles connecting the wheels of one set with the wheels of the other set and being journalled in said journal members, detachable means on said rods for spacing the journal members of each pair, flexible means for positioning the traction frame, with reference to the main frame, part of said means being constructed to permit relative pivotal movement of said traction frame, and a take-up means for said endless belts on said traction frame.

23. In traction mechanism, the combination with a main frame and an endless traction belt located near the side of said frame, of a traction frame rod therefor provided with a pair of tubular spacing members and a bearing box positioned between said members, a weight bearing wheel for said endless traction belt journalled in said bearing box, and a spring means operatively interposed between said traction frame rod and said main frame.

24. In traction mechanism, the combination with a main frame and an endless traction belt located near the side of said frame, of a traction frame rod therefor provided with a pair of tubular spacing members and a bearing box positioned between said members, a weight bearing wheel for said endless traction belt journalled in said bearing box, and a spring means operatively interposed between said traction frame rod and said main frame, part of said spring means pivotally connected with said rod.

25. In traction mechanism, the combination with a main tractor frame, of a substantially rectangular traction sub-frame therefor embodying a pair of longitudinally disposed frame rod members of substantially circular cross-section and front and rear transverse frame members connecting said rod members whereby to permit slight relative movement at the joints in a vertical direction during tractor movement, transversely aligned bearing boxes mounted on said rod members, tubular spacing means for said boxes removably carried by said rod members, axles extending through said bearing boxes in parallelism with said transverse frame members, and weight bearing wheels on said axles disposed at each side of the sub-frame.

26. In traction mechanism, the combination with a main tractor frame, of a substantially rectangular traction sub-frame therefor embodying a pair of longitudinally disposed frame rod members of substantially circular cross-section and front and rear transverse frame members connecting said rod members whereby to permit slight relative movement at the joints in a vertical direction during tractor movement, transversely aligned bearing boxes mounted on said rod members, tubular spacing means for said boxes removably carried by said rod members, axles extending through said bearing boxes in parallelism with said transverse frame members, weight bearing wheels on said axles disposed at each side of the sub-frame, and leaved spring means inclining forwardly to the main frame from the rear transverse frame member and with which latter said means has a pivotal connection.

27. In traction mechanism, the combination with a main tractor frame, of a substantially rectangular traction sub-frame therefor embodying a pair of longitudinally disposed frame rod members of substantially circular cross-section and front and rear transverse frame members connecting said rod members whereby to permit slight relative movement at the joints in a vertical direction during tractor movement, transversely aligned bearing boxes mounted on said rod members, tubular spacing means for said boxes removably carried by said rod members, axles extending through said bearing boxes in parallelism with said transverse frame members, and weight bearing wheels on said axles and disposed at each side of the sub-frame, said axles forming part of the sub-frame.

28. In traction mechanism, the combination with a main frame, of a substantially rectangular traction sub-frame located directly below said main frame and embodying flexibly jointed longitudinal and transverse frame members, means connecting one of the transverse frame members to portions of said main frame, axles extending from one longitudinal frame member to the other, and bearing wheels disposed on said axles at the sides of the frames said axles having bearings in the longitudinal frame members.

29. In traction mechanism, the combination with a main traction frame, of a horizontally disposed substantially rectangular traction sub-frame paralleling the main frame and located directly below it, means constructed and arranged between said frames whereby the main frame is yieldingly supported by the sub-frame and whereby, during tractor movement, the sub-frame has slight pivotal movement relative to said main frame, bearing wheels located at the sides of said frames, wheel carrying axles extending across the sub frame and journalled in side portions of the sub-frame, said side portions being flexibly joined near their ends and the joints being relatively tiltable.

30. In tractor mechanism, the combination with a main tractor frame having a pair of endless traction belts disposed alongside said frame, of a horizontally disposed rectangular traction sub-frame therefor, yielding means constructed and arranged with reference to said frames to yieldingly support the side members only of the main frame and to provide a floating pivotal axis for the sub-frame, and bearing wheels engaging the lower stretches of said belts and axially journalled in side portions of said sub-frame.

31. In tractor mechanism, the combination with a main tractor frame comprising side members and having a pair of endless traction belts disposed alongside said frame, of a horizontally disposed rectangular traction sub-frame therefor, yielding means between said frames to yieldingly support the side members only of the main frame and provide a floating pivotal axis for the sub-frame, and bearing wheels engaging the lower stretches of said belts and axially journalled in side portions of said sub-frame, both said frames being provided with transverse members operatively engaging said yielding means.

32. In tractor mechanism, the combination with a main tractor frame having a pair of endless traction belts disposed alongside said frame, of a horizontally disposed rectangular traction sub-frame therefor, comprising longitudinal members, bearings loosely carried thereby and transverse axles extending between said members and journaled in said bearings, yielding means constructed and arranged with reference to said frames to yieldingly support the main frame and to provide a floating pivotal axis for the sub-frame, and bearing wheels engaging the lower stretches of said belts and carried by said axles, both said frames being provided with transverse members operatively engaging said yielding means, and one of said transverse members having a swivelled locking connection with said sub-frame side portions.

33. In tractor mechanism, the combination with a main tractor frame having a pair of endless traction belts disposed alongside said frame, of a horizontally disposed rectangular traction sub-frame therefor, yielding means constructed and arranged with reference to said frames to yieldingly support the main frame and to provide a floating pivotal axis for the sub-frame, bearing wheels engaging the lower stretches of said belts and axially journalled in side portions of said sub-frame, drive sprockets for the belts mounted in the rear of the main frame, a sleeve forming part of the forward portion of the sub-frame, an axle in said sleeve, and idler sprockets for said belts carried by said sleeve.

34. In tractor mechanism, the combination with a main tractor frame having a pair of endless traction belts disposed alongside said frame, of a horizontally disposed rectangular traction sub-frame therefor, yielding means constructed and arranged with reference to said frames to yieldingly support the main frame and to provide a floating pivotal axis for the sub-frame, bearing wheels engaging the lower stretches of said belts and axially journalled in side portions of said sub-frame, traction sprockets for the belts in the rear of the main frame, a sleeve forming a part of the forward portion of the sub-frame and loosely carried on the side portions thereof, a flexible connection between the sleeve and the main frame, belt take-up means having a ball and socket connection with said sleeve, an axle in said sleeve, and idler wheels for said belts mounted in said sleeve.

35. In traction mechanism, the combination of a tractor main frame, an endless traction belt, a longitudinally disposed sub-frame therefor provided with spring means associated with said main frame and having a weight bearing wheel positioned in operative relation to the lower stretch of the belt, traction drive and idler members mounted in said frames to drive and position the belt, part of said spring means being disposed rearwardly of and inclined toward the other part and having a yielding pivotal connection with the sub-frame.

36. In a traction mechanism, the combination with a main frame, sets of bearing wheels, and endless belts therefor driven from said main frame, of a pair of longitudinal rods having flexible connections with said main frame, bearings carried by said rods for said sets of wheels, spacing elements for the bearings positioned on the rods between the flexible connections, and means on said rods for tightening said belts.

37. In a traction mechanism, the combination with a main frame, sets of bearing wheels, and endless belts therefor driven from said main frame, of a pair of longitudinal rods having flexible connections with said main frame, bearings carried by said rods for said sets of wheels, spacing elements for the bearings positioned on the rods between the flexible connections, idler wheels for said belts having an axle, and a bearing sleeve for the axle connecting the front ends of said rods.

38. In a traction mechanism, the combination with a main frame, sets of bearing wheels, and endless belts therefor driven from said main frame, of a pair of longitudinal rods having flexible connections with said main frame, bearings carried by said rods for said sets of wheels, spacing elements for the bearings positioned on the rods between the flexible connections, idler wheels for said belts having an axle, and a bearing sleeve for the axle connecting the front ends of said rods, said sleeve being provided with belt positioning means associated with the main frame and said rods.

39. In a traction truck, the combination of a truck rod provided with alternately disposed journal box and tubular spacing members, the journal box member having a bearing on said rod intermediate the opposed inner ends of the spacing members.

40. In a traction truck, the combination of a truck rod removably provided with alternately disposed tubular spacing and journal box members, the journal box members having bearings on said rod at the ends of the tubular spacing member.

GEORGE C. JETT.